United States Patent [19]

Robinson et al.

[11] Patent Number: 5,764,520
[45] Date of Patent: Jun. 9, 1998

[54] CONTROL OF LOTS IN A CONTINUOUS ENVIRONMENT

[75] Inventors: Jeffrey A. Robinson, Glendale; Udey Chaudhry, Mesa, both of Ariz.

[73] Assignee: Motorola, Inc., Schaumburg, Ill.

[21] Appl. No.: 498,524

[22] Filed: Jul. 5, 1995

Related U.S. Application Data

[63] Continuation of Ser. No. 55,894, May 4, 1993, abandoned.
[51] Int. Cl.$^6$ .............................. G06F 19/00; G06G 7/64; G06G 7/66
[52] U.S. Cl. ............... 364/468.22; 364/550; 364/478.01; 364/468.28
[58] Field of Search ....................... 364/468, 478, 364/479, 403, 401, 402, 468.01, 468.06, 468.09, 468.19, 468.28; 395/924

[56] References Cited

U.S. PATENT DOCUMENTS

| | | | |
|---|---|---|---|
| 4,802,094 | 1/1989 | Nakamura et al. | 364/468 |
| 4,956,778 | 9/1990 | Hadavi et al. | 364/468 |
| 5,164,905 | 11/1992 | Iwasaki et al. | 364/468 |
| 5,243,531 | 9/1993 | DiPippo et al. | 364/468 |
| 5,255,181 | 10/1993 | Chapman et al. | 364/468 |
| 5,455,894 | 10/1995 | Conboy et al. | 395/82 |

Primary Examiner—Joseph Ruggiero
Assistant Examiner—Sheela S. Rao
Attorney, Agent, or Firm—Robert D. Atkins

[57] ABSTRACT

A method for controlling production lots which deals with production lots comprising a plurality of discrete units distributed among a plurality of locations. A first event is triggered when a first unit from a first production lot enters a processing step. A second event is triggered when a last unit from the first production lot leaves the processing step.

8 Claims, 2 Drawing Sheets

CONTROL OF LOTS IN A CONTINUOUS ENVIRONMENT

This application is a continuation of prior application Ser. No. 08/055,894, filed May 4, 1993, now abandoned.

RELATED APPLICATION

The present application is related to co-pending application entitled "METHOD FOR PROCESS CONTROL", Robinson et al, U.S. patent application Ser. No. 08/603,514, which application is filed on even date herewith and is included herein by reference.

BACKGROUND OF THE INVENTION

The present invention relates, in general, to computer modeling of manufacturing processes, and more particularly to a method for controlling production lots.

Process definition languages and process representation models in accordance with the prior art do not adequately model the characteristics of continuous flow processes. A continuous flow process is one in which material is processed through multiple paths or in parallel. Material processed in this way often has the contents of a single lot processed through cluster tools or through automated equipment cells which process the materials in parallel through multiple pieces of equipment. Lots of material in this environment behave differently than lots in a traditional manufacturing environment. Sometimes lots will lose their discrete nature and become spread over several different operations or equipment at one time. Such behaviors are difficult to model using discrete manufacturing control systems of the prior art. Moreover, the logging of lot processing events and the control of lots become quite complex.

The first solution according to the prior art was "serialized tracking". That is, when a lot needs to exist at more than one location, the lot is broken into two or more pieces. Each piece of the lot assumes its own identity and proceeds independently of the material remaining in the first lot in effect creating new lots. In the extreme case where all material must flow continuously, each unit in the lot must be given a unique identity and tracked independently. When the original quantity of units in the lot is large, this breakdown into individual units can result in the creation of an unacceptably large number of lots. For example, starting with a typical integrated circuit assembly operation with an initial configuration of 10 lots each having 600 integrated circuits one would end up with 6,000 lots each containing one integrated circuit. Serialized tracking suffers from the deficiency that the tracking effort increases faster than the number of lots tracked. This increased tracking effort is reflected as increases in the amount of computer power, disk space, and support personnel required to keep track of the same amount of material. Very few manufacturing facilities operate at a volume which is low enough to economically consider serialized tracking.

The second prior art approach is termed the black box approach. The black box approach simply compresses all of the steps that can occur simultaneously into a single step using the discrete model. According to this approach a lot would track into the step and be processed below the resolution of the system to track, control, or model. When completed this lot would then reappear as it tracks out of that composite step. This approach is useful enough to have encouraged development specialized "cell controller" computer systems. Cell controller computers are small computer systems designed to manage sets of equipment. This has led to the advent of "islands of automation" which have popped up throughout industry. The problem is that this results in progressively less accurate modeling together with less visibility and control as the regions of continuous manufacturing expand. In a typical semiconductor manufacturing facility, the entire factory would have to be reduced to a single process step to use the black box approach. There is simply no straightforward way to model all of the activities occurring within the manufacturing facility.

There is a need to track and hence to control both discrete and continuous processes simultaneously. This tracking method should be applicable to a large range of manufacturing activities that cannot be tracked according to the prior art. Such a method should allow both traceability of individual lots and control of manufacturing flows which allow lots to behave discretely or continuously and yet maintain the characteristics of both while reflecting the reality of the factory floor.

SUMMARY OF THE INVENTION

The present invention relates to a method for controlling production lots. A first production lot is provided having a plurality of units identified by a first lot identifier. A first unit of the first production lot is logged in at a first recordable process step to track a leading edge of the first production lot. The first unit of the first production lot is passed to subsequent recordable process steps. The other units of the first production lot are processed through the first recordable process step and the subsequent recordable process steps such that the units of the first production lot reside at a plurality of recordable process steps while maintaining identification by the first lot identifier without splitting the lot into sublots. A last unit of the first production lot is logged out of the first recordable process step to track a trailing edge of the first production lot.

The present invention further relates to a computer implemented method of manufacturing a semiconductor device. A first processing step is provided followed by a second processing step where the first and second processing steps are loggable into a database. A lot comprising a plurality of semiconductor devices is provided. The lot is logged into the second processing step upon arrival of a first semiconductor device of the lot at the second processing step while a second semiconductor device of the lot remains logged at the first processing step. The first and second semiconductor devices are identified by the same lot identifier while the lot resides simultaneously at the first and second processing steps.

DETAILED DESCRIPTION OF THE DRAWINGS

Figure 1:
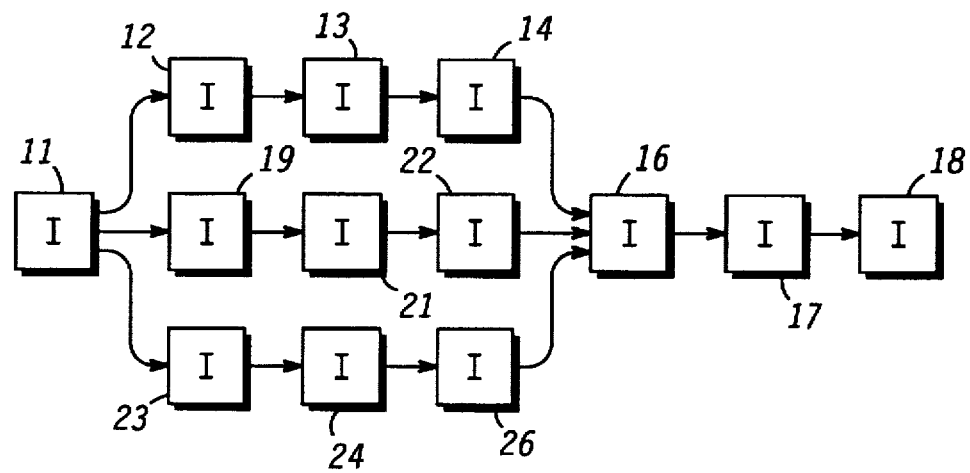
FIG. 1 shows a schematic drawing which illustrates a network of manufacturing tasks at an initial time as a preferred embodiment in accordance with the present invention.

FIG. 1 shows a schematic drawing which illustrates a network of manufacturing tasks at an initial time as a preferred embodiment in accordance with the present invention. Processing through the tasks begins with a single task 11. Output from task 11 is delivered to any one of three tasks 12, 19, or 23. Processing from task 12 continues through task 13 and task 14 to converge on a task 16. Likewise task 19 passes material to tasks 21 and 22 followed by task 16. Task 23 passes material to tasks 24 and 26 before passing material to task 16. Task 16 is a single task which accepts material from tasks 14, 22, and 26. Material from task 16 is then sent to task 17 and task 18 which completes the process. At the initial time illustrated by FIG. 1 all tasks are in an idle state denoted with the capital letter I inside the square representing the task.

This example is based on a manufacturing flow where each production lot comprises manufactured items, for example fabrication of an integrated circuit. It should be clearly understood however, that process flows of this type are equally applicable to data packets being forwarded by a communications network. Alternatively the network could describe units of freight being transported from place to place by an aircraft with each processing step comprising flying the freight from one location to another as this freight is forwarded to the desired destination.

Applications of the preferred embodiment include data gathering wherein some item of desired information is recorded which is associated with the first production lot. For example different lots may have different performance characteristics in an integrated circuit fabrication line thus the individual lots are determined by testing and recording the performance of the device under controlled circumstances. In this case production equipment is often adjusted in accordance with the required parameters for each lot.

Typically this network is implemented in a computer memory which represents the characteristics of each task and records the state transition as the first unit or leading edge marker passes into each new task. Likewise the last unit or trailing edge marker restores each task and its representation in computer memory to an idle state. In certain applications such as airline baggage handling a special piece of baggage is used as a marker to separate the identity of one lot from the succeeding lot. Alternatively the leading edge marker can comprise an event such as a piece of equipment being turned on or a communications link being established.

Figure 2:
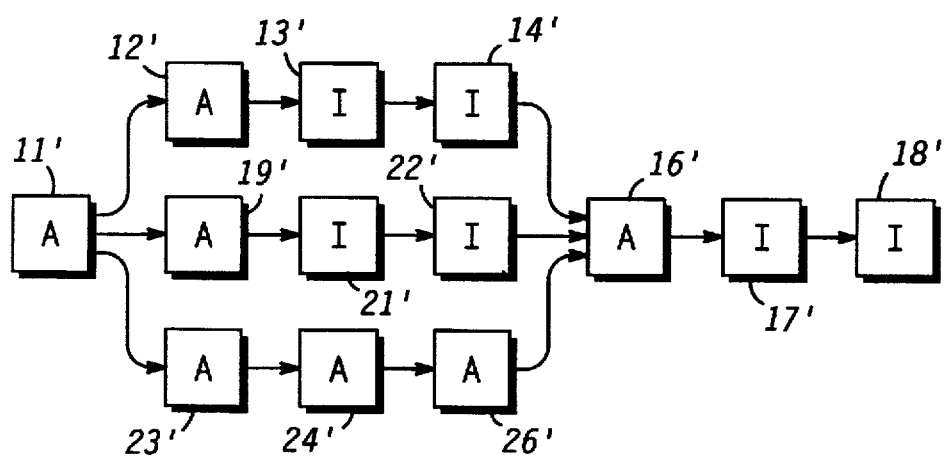
FIG. 2 shows a schematic drawing which illustrates the network of manufacturing tasks shown in FIG. 1 subsequent to initiating the processing of a lot as a preferred embodiment in accordance with the present invention.

FIG. 2 shows a schematic drawing which illustrates the network of manufacturing tasks shown in FIG. 1 subsequent to initiation of the processing of a lot as a preferred embodiment in accordance with the present invention. Lot A begins at task 11' as a single location. When the first unit of Lot A completes task 11' it is passed on to one of task 12', task 19', or task 23'. In the example shown it is assumed that this process has continued until tasks 12', 19', 23', 24', 26', and 16' are all processing units from Lot A. Tasks 13', 14', 21', 22', 17', and 18' are still in the idle state. Thus the location of Lot A has spread through the network according to the tasks which are currently working on Lot A. It can be said that the first unit of Lot A to enter each task comprises a spreading activation of the network by Lot A. This is analogous to spreading of a wave front of a fluid such as water through channels cut in a solid material. The leading edge of the water determines which areas are wet and which areas are still dry. Likewise the first unit from Lot A to reach each task determines whether that task is in an idle state or processing Lot A. Thus, FIG. 2 illustrates how Lot A spreads across several steps of the network simultaneously as the positions of the leading edge 16' and the trailing edge 11' diverge.

Figure 3:
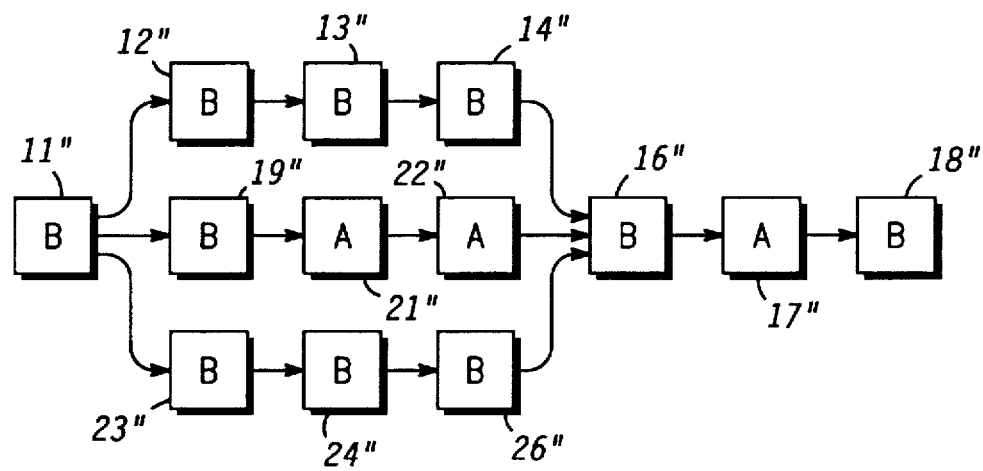
FIG. 3 shows a schematic drawing which illustrates the network of manufacturing tasks shown in FIG. 2 subsequent to initiating the processing of a second lot as a preferred embodiment in accordance with the present invention.

FIG. 3 shows a schematic drawing which illustrates the network of manufacturing tasks shown in FIG. 2 subsequent to initiation of the processing of a second lot as a preferred embodiment in accordance with the present invention. As processing proceeds all units of Lot A finish processing at task 11' (FIG. 1) and proceed through the network. A new Lot B is then introduced at task 11', proceeding through the network following Lot A. In the example shown by FIG. 3 it is assumed that different processing paths have different flow rates and therefore the trailing units of Lot A are still being processed by tasks 21" and 22" while the first units of Lot B have already arrived at task 16" and 18".

When a task receives a unit from new Lot B its state is activated to the identifier Lot B. Thus task 16" can be seen to have switched from Lot B to Lot A to Lot B in succession preceding the time of this example. By representing the tasks as having a state which corresponds to the activating lot the status of the entire network can be described without breaking up either Lot A or Lot B even though units from Lot A are interposed between units from Lot B. Interposition occurs at tasks 16", 17", and 18" in this example. The leading edge of Lot A is at 17" and the trailing edge of Lot A is at 21". Lot B has a leading edge 18" and a trailing edge at 11". Lot B will have tracked into steps 16" and 17", by the processing of its leading edge, before Lot A has tracked out of steps 16" and 17", by its trailing edge.

Figure 4:
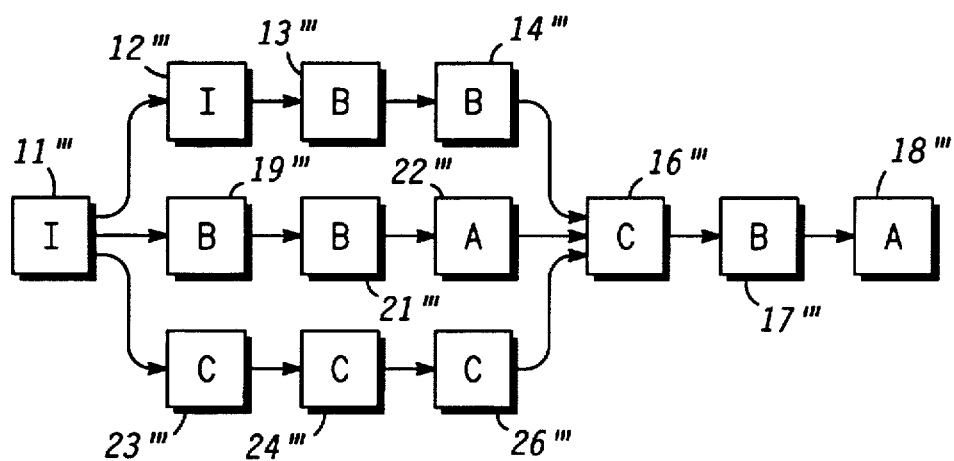
FIG. 4 shows a schematic drawing which illustrates the network of manufacturing tasks shown in FIG. 3 subsequent to initiating the processing of a third lot as a preferred embodiment in accordance with the present invention.

FIG. 4 shows a schematic drawing which illustrates the network of manufacturing tasks shown in FIG. 3 subsequent to initiation of the processing of a third lot as a preferred embodiment in accordance with the present invention. At this later time a Lot C has been introduced to task 11''' following the completion of all units from Lot B. As before either the last unit of Lot A or the first unit of Lot B or C triggers a state change to the appropriate lot. Task 12''' has detected the last unit of Lot B but has no succeeding unit in its input queue. Accordingly task 12''' reverts to an idle state.

Tracking of lots only needs to be performed at the leading and trailing edges of the lot. Where the manufacturing line is configured in a streamlined fashion so that individually units move serially down the line such as tasks 16''', 17''', and 18,''', freedom of movement can be retained without having to identify each unit. A lot simply becomes spread across many locations within the manufacturing line and is no longer constrained to remain on a single piece of equipment. The lot becomes bounded by a leading and a trailing edge. Everything within those two moving boundaries is defined as a single lot with a single manufacturing history and traceability record. As the lot moves the region of the network that corresponds to an individual lot changes. Only the region between the leading and trailing edges of the lot is "activated" in the context of a particular lot. The control of material at individual pieces of equipment within the network continues unchanged so long as that region of the network is activated within context of a certain lot for example Lot A.

Individual pieces of equipment function in a continuous manner. Each piece of equipment processes individual units from the lot as they arrive and sends them on to the next processing points. The automated pieces of equipment need not know about the lot identity of individual units. The automated equipment needs only to know when a unit for a new lot has arrived. When this occurs a state transition occurs at that node of the network. The state changes persist until they are changed or reset by the receipt of a new marker that represents a new lot traversing the network.

At these transition points a specific tracking activity may occur for example a different automated recipe may need to be downloaded or machine set-ups may need to be changed. Accumulated machine counts may need to be sent up for the previous lot and the counters reinitialized for the new lot. All of these actions can be taken when the first unit of the new lot arrives. So long as the next unit that arrives does not represent a member of a new lot, the equipment does not even pause, it simply processes the arriving units in the same way that it processed the previous one. Only the arrival of new lots trigger state changes in individual pieces of equipment.

Referring again to FIG. 4, in another tracking example of the present invention, it is assumed that the portion of Lot A at task 22''' moves forward in the process. The movement is described as follows. As the trailing edge of the portion of Lot A at task 22''', i.e. the trailing edge of Lot A, passes out of task 22''', the entirety of Lot A is tracked out of task 22''' as having completed task 22'''. As the trailing edge of the portion of Lot A, that was at task 22''',' passes out of task 16''' and task 17''', the entirety of Lot A is likewise tracked out of the respective steps. Thus, the portion of Lot A that was at task 22''' is now at the same task, i.e. task 18''', as the portion of Lot A that was residing at task 18'''.

Therefore, it can be appreciated that as an advantage of the present invention, a lot can be spread amongst multiple process tasks, or steps, and interposed between other lots in the process. It can be further appreciated that a lot is tracked solely by its leading and trailing edges and without regard to the unique identification of each unit within the lot.

Subsequently, the portion of Lot A that was originally at task 22''' of FIG. 4, is processed ahead of the portion of Lot A that resides at task 18'''. Since the portion of Lot A of task 22''' has finished task 18''' ahead of the portion of Lot A residing at task 18''', the trailing edge of Lot A has transferred to the portion of Lot A remaining at task 18'''. When this portion of Lot A completes task 18''', the trailing edge of this portion of Lot A tracks out the entire Lot A from task 18'''. Thus it can be even further appreciated that the present invention permits units of a lot to be processed in a non-ordered fashion, independent of schemes such as FIFO or FILO. Only the leading and trailing edges of the lot are used for tracking purposes.

By now it should be clear that the present invention provides a method to track and hence to control both discrete and continuous processes simultaneously. This tracking method is applicable to a large range of manufacturing activities that cannot be tracked according to the prior art. The method allows both traceability of individual lots and control of manufacturing flows which allows lots to behave discretely or continuously as required and yet maintain the characteristics of both while still reflecting the realities of the factory floor. At no time is a lot hidden from view by compressing multiple steps into a single block within invisible contents, lots are never split into two thus the lots may be reunited at a convenient processing step into a unified whole.

Thus it can now be appreciated that, as an advantage of the present invention, a lot is permitted to exist at multiple physical or logical locations in a network. The leading edge of a lot of material is tracked independently from the trailing edge of the same lot and the lot no longer resides at a single process step of the network. Instead, a lot physical location would correspond to an activated region of the network, the process steps of the network residing between the leading and trailing edge of the lot. It can be further appreciated that units of a first lot are capable of being interposed with units of a second lot while maintaining tracking of the lots only by their respective leading and trailing edges. As such, a unique identity is not required for each unit, of each of the respective lots, to maintain lot tracking.

We claim:

1. A method for controlling production lots, comprising the steps of:

providing a first production lot having a plurality of units identified by a first lot identifier;

logging in a first unit of said first production lot at a first recordable process step to track a leading edge of said first production lot;

passing said first unit of said first production lot to subsequent recordable process steps;

processing other units of said first production lot through said first recordable process step and said subsequent recordable process steps such that said units of said first production lot reside at a plurality of recordable process steps while maintaining identification by said first lot identifier without splitting said lot into sublots; and logging out a last unit of said first production lot at said first recordable process step to track a trailing edge of said first production lot.

2. The method of claim 1 further comprising the steps of:

providing a second production lot having a plurality of units identified by a second lot number;

logging in a first unit of said second production lot at a first process step to track a leading edge of said second production lot;

passing said first unit of said second production lot to subsequent process steps;

processing other units of said second production lot through said first process step and said subsequent process steps such that said units of said second production lot reside at a plurality of process steps while maintaining identification by said second lot number; and logging out a last unit of said second production lot at said first process step to track a trailing edge of said second production lot.

3. The method of claim 2 further comprising the step of interposing one of said plurality of units from said first production lot with a one of said plurality of units from said second production lot at one of said plurality of said process steps.

4. A computer implemented method for controlling production lots, comprising the steps of:

providing a first production lot having a plurality of units identified by a first lot identifier;

logging in a first unit of said first production lot at a first recordable process step to track a leading edge of said first production lot;

passing said first unit of said first production lot to a second recordable process step while other units of said first production lot remain at said first recordable processing step;

logging in said first unit of said first production lot at said second recordable process step while maintaining identification by said first lot identifier and without splitting said lot into sublots; and logging out a last unit of said first production lot at said first recordable process step to track a trailing edge of said first production lot.

5. A computer implemented method of controlling a lot in a semiconductor manufacturing process, comprising the steps of:

provlding a first processing step followed by a second processing step where the first and second processing steps are loggable into a database; and logging the lot into the second processing step upon arrival of a first semiconductor device of the lot at the second processing step while a second semiconductor device of the lot remains logged at the first processing step, wherein the first and second semiconductor devices are identified by the same lot identifier while the lot resides simultaneously at the first and second processing steps.

6. The computer implemented method of claim 5 further comprising the steps of logging the lot out of the first processing step with departure of a last semiconductor device of the lot from the first processing step while the lot remains logged at the second processing step.

7. The computer implemented method of claim 6 wherein logging transactions of the first semiconductor device of the lot and logging transaction of the last semiconductor device of the lot occur independently.

8. A computer implemented method of manufacturing a semiconductor device, comprising the steps of:

providing a first processing step followed by a second processing step where the first and second processing steps are loggable into a database;

providing a lot comprising a plurality of semiconductor devices; and logging the lot into the second processing step upon arrival of a first semiconductor device of the lot at the second processing step while a second semiconductor device of the lot remains logged at the first processing step, wherein the first and second semiconductor devices are identified by the same lot identifier while the lot resides simultaneously at the first and second processing steps.

\* \* \* \* \*